(12) United States Patent
Hatano

(10) Patent No.: US 10,434,733 B2
(45) Date of Patent: Oct. 8, 2019

(54) METHOD FOR PRODUCING RETARDATION FILM

(71) Applicant: ZEON CORPORATION, Tokyo (JP)

(72) Inventor: Taku Hatano, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 296 days.

(21) Appl. No.: 15/613,893

(22) Filed: Jun. 5, 2017

(65) Prior Publication Data

US 2017/0266898 A1    Sep. 21, 2017

Related U.S. Application Data

(60) Division of application No. 14/690,563, filed on Apr. 20, 2015, which is a continuation of application No. 12/371,317, filed on Feb. 13, 2009, now abandoned.

(Continued)

(30) Foreign Application Priority Data

Feb. 14, 2008 (JP) .................................. 2008-033782

(51) Int. Cl.
  B29D 11/00 (2006.01)
  B29C 55/02 (2006.01)
  (Continued)

(52) U.S. Cl.
  CPC ...... B29D 11/00788 (2013.01); B29C 55/023 (2013.01); B29C 55/14 (2013.01);
  (Continued)

(58) Field of Classification Search
  CPC ........ B29D 11/00788; B29D 11/00644; B29C 55/023; B29C 55/014; B32B 7/02;
  (Continued)

(56) References Cited

U.S. PATENT DOCUMENTS

| | | |
|---|---|---|
| 2004/0085642 A1 | 5/2004 | Condo et al. |
| 2006/0040106 A1 | 2/2006 | Arakawa et al. |

(Continued)

FOREIGN PATENT DOCUMENTS

| | | |
|---|---|---|
| EP | 1 517 162 A | 3/2005 |
| JP | 02-160204 | 6/1990 |

(Continued)

*Primary Examiner* — Mathieu D Vargot
(74) *Attorney, Agent, or Firm* — Birch, Stewart, Kolasch & Birch, LLP

(57) ABSTRACT

A method for producing a retardation film comprising the steps of: (a) uniaxially stretching an original film for producing retardation film in one direction at either a temperature T1 or T2; and then (b) uniaxially stretching the film stretched in the step (a) in a direction perpendicular to the above-mentioned direction of stretching at a temperature T2 or T1 different from the above-mentioned temperature, in which the original film for producing retardation film has a characteristic that a phase of linearly polarized light entering vertically into the film plane and having an oscillating surface of an electric vector in an X-Z plane against linearly polarized light entering vertically into the film plane and having an oscillating surface of an electric vector in a Y-Z plane lags by uniaxially stretching in the direction of the X axis at a temperature T1, and leads by uniaxially stretching in the direction of the X axis at a temperature T2 different from the above-mentioned temperature T1, in which the X axis is an uniaxially stretching direction, the Y axis is a direction perpendicular to the uniaxially stretching direction in the film plane, and the Z axis is a direction of a thickness of the film.

6 Claims, 1 Drawing Sheet

Related U.S. Application Data

(60) Provisional application No. 61/080,945, filed on Jul. 15, 2008.

(51) Int. Cl.

| | | |
|---|---|---|
| *B29C 55/14* | (2006.01) | |
| *B32B 7/02* | (2019.01) | |
| *B32B 27/08* | (2006.01) | |
| *G02B 5/30* | (2006.01) | |
| *B32B 23/08* | (2006.01) | |
| *B32B 23/20* | (2006.01) | |
| *B32B 27/18* | (2006.01) | |
| *B32B 27/20* | (2006.01) | |
| *B32B 27/22* | (2006.01) | |
| *B32B 27/28* | (2006.01) | |
| *B32B 27/30* | (2006.01) | |
| *B32B 27/32* | (2006.01) | |
| *B32B 27/36* | (2006.01) | |
| *C08J 5/18* | (2006.01) | |
| *G02F 1/13363* | (2006.01) | |
| *B29K 25/00* | (2006.01) | |
| *B29K 69/00* | (2006.01) | |

(52) U.S. Cl.
CPC ......... *B29D 11/00644* (2013.01); *B32B 7/02* (2013.01); *B32B 23/08* (2013.01); *B32B 23/20* (2013.01); *B32B 27/08* (2013.01); *B32B 27/18* (2013.01); *B32B 27/20* (2013.01); *B32B 27/22* (2013.01); *B32B 27/286* (2013.01); *B32B 27/302* (2013.01); *B32B 27/304* (2013.01); *B32B 27/306* (2013.01); *B32B 27/308* (2013.01); *B32B 27/32* (2013.01); *B32B 27/36* (2013.01); *B32B 27/365* (2013.01); *C08J 5/18* (2013.01); *G02B 5/3083* (2013.01); *B29K 2025/06* (2013.01); *B29K 2069/00* (2013.01); *B29K 2995/0034* (2013.01); *B32B 2264/025* (2013.01); *B32B 2264/0235* (2013.01); *B32B 2264/04* (2013.01); *B32B 2264/102* (2013.01); *B32B 2264/104* (2013.01); *B32B 2270/00* (2013.01); *B32B 2307/306* (2013.01); *B32B 2307/40* (2013.01); *B32B 2307/42* (2013.01); *B32B 2307/516* (2013.01); *B32B 2307/558* (2013.01); *B32B 2307/71* (2013.01); *B32B 2307/744* (2013.01); *B32B 2457/202* (2013.01); *C08J 2325/06* (2013.01); *C08J 2369/00* (2013.01); *G02F 1/133634* (2013.01); *Y10T 428/2495* (2015.01); *Y10T 428/31507* (2015.04)

(58) Field of Classification Search
CPC ......... B32B 27/08; B32B 27/18; B32B 27/20; B32B 27/22; B32B 27/32; B32B 27/36; B32B 23/08; B32B 23/20
See application file for complete search history.

(56) References Cited

U.S. PATENT DOCUMENTS

| | | |
|---|---|---|
| 2007/0064177 A1 | 3/2007 | Itadani et al. |
| 2008/0095955 A1 | 4/2008 | Miyaki et al. |

FOREIGN PATENT DOCUMENTS

| | | |
|---|---|---|
| JP | 03-024502 | 2/1991 |
| JP | 03-141303 | 6/1991 |
| JP | 05-157911 | 6/1993 |
| JP | 2002-156525 A | 5/2002 |
| WO | WO 2007/075264 A | 7/2007 |

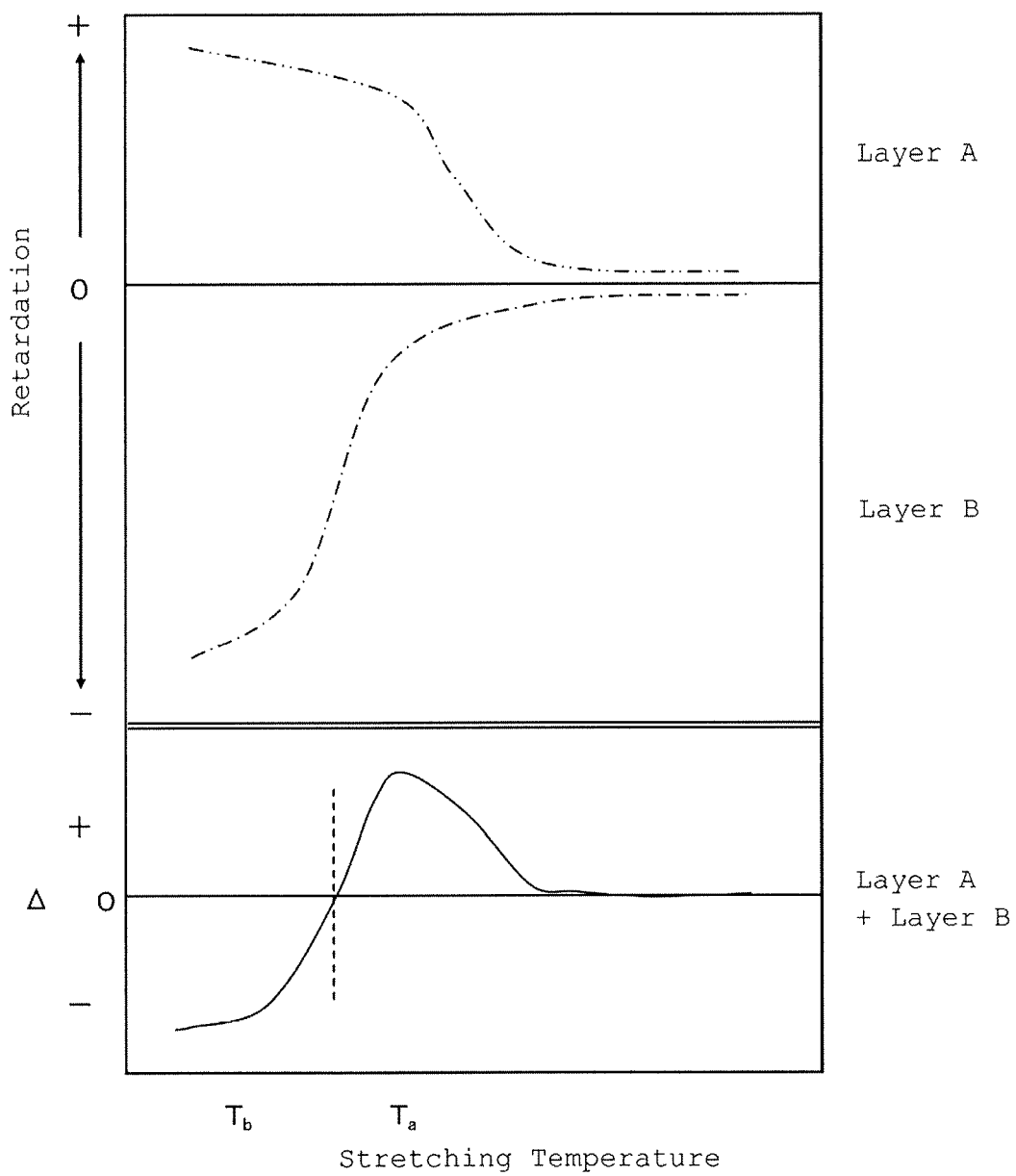

METHOD FOR PRODUCING RETARDATION FILM

This application is a Divisional of copending application Ser. No. 14/690,563, filed Apr. 20, 2015, now U.S. Pat. No. 9,694,550, which is a Continuation of application Ser. No. 12/371,317, filed on Feb. 13, 2009, now abandoned, which claims priority under 35 U.S.C. § 119(e) to U.S. Provisional Application No. 61/080,945, filed on Jul. 15, 2008, and under 35 U.S.C. § 119(a) to Application No. 2008-033782, filed in JAPAN on Feb. 14, 2008, all of which are hereby expressly incorporated by reference into the present application.

TECHNICAL FIELD

The present invention relates to a method for producing a retardation film. More particularly, the present invention relates to a method for producing a retardation film suitable for birefringence compensation of a liquid crystal display device.

BACKGROUND OF THE ART

To decrease dependence of a color tone in a liquid crystal display device on an angle, a retardation film which satisfies a relation of $0.92 \leq R_{40}/Re \leq 1.08$, in which Re is a retardation value at an incident angle of 0 degrees, and $R_{40}$ is a retardation value at an incident angle of 40 degrees, or a retardation film which satisfies a relation of $n_x > n_z > n_y$, in which $n_x$ is a refractive index in a slow axis direction in a plane, $n_y$ is a refractive index in a direction at a right angle to the slow axis direction in the plane, and $n_z$ is a refractive index in a thickness direction, have been proposed.

For example, Patent Document 1 discloses that a first anisotropic film is obtained by uniaxially stretching a polycarbonate resin film, a second anisotropic film is obtained by uniaxially stretching a polystyrene resin film on the other hand, and then a retardation film which satisfies a relation of $n_x > n_z > n_y$ is obtained by overlapping the first anisotropic film and the second anisotropic film so that the directions of stretching of the films are at right angles to each other.

Patent Document 2 discloses that a first anisotropic film is obtained by uniaxially stretching a polycarbonate resin film, a second anisotropic film is obtained by uniaxially stretching a polystyrene resin film on the other hand, and then a retardation film which satisfies a relation of $(Re-Re_{40})/Re \leq 0.07$ is obtained by overlapping the first anisotropic film and the second anisotropic film so that the directions of stretching are at right angle to each other.

In these producing methods described in the patent document 1 or patent document 2, an accurate axis match is required when the films are stuck together.

Patent Document 3 discloses that a laminated body is formed by bonding a shrinkable film to one side or both sides of a resin film before the resin film is stretched, and stretching and heating of the laminated body so as to give a contractive force in a direction perpendicular to a stretching direction of the above-mentioned resin film results in obtaining a retardation film which satisfies a relation of $0<(n_x-n_z)/(n_x-n_y)<1$.

In the producing method described in the patent document 3, the contractive force should be controlled accurately.

Patent Document 4 discloses that a rod is obtained by extrusion molding of a melted polycarbonate resin, a disc is obtained by slicing up the rod in round, a rectangular film is obtained by cutting the disc, and then a retardation film which satisfies a relation of $0.92 \leq Re_{40}/Re \leq 1.08$ is obtained by uniaxially stretching the rectangular film.

However, it is difficult to produce the retardation film having a large area by the producing method described in the Patent Document 4.

PRIOR ART DOCUMENTS

[Patent Document 1] Japanese Published Unexamined Patent Application No. H03-24502
[Patent Document 2] Japanese Published Unexamined Patent Application No. H03-141303
[Patent Document 3] Japanese Published Unexamined Patent Application No. H05-157911
[Patent Document 4] Japanese Published Unexamined Patent Application No. H02-160204

SUMMARY OF THE INVENTION

Problems to be Resolved by the Invention

An object of the present invention is to provide a method for producing a retardation film comprising a laminate of a plurality of layers so that the molecular orientation axes of the layers cross each other at a right angle, with good productivity without needing the step of sticking together to match the axis.

In addition, an object of the present invention is to provide a simple and high-accuracy method for producing a retardation film having a large area which satisfies a relation of $n_x > n_z > n_y$; or a retardation film having a large area which satisfies a relation of $0.92 \leq R_{40}/Re \leq 1.08$.

Means for Solving the Problems

As the result of studies by the present inventor to achieve the above-mentioned objects, it was found that a retardation film having a large area which satisfies a relation of $n_x > n_z > n_y$, in which $n_x$ is a refractive index in a slow axis direction in a plane of the film, $n_y$ is a refractive index in a direction at a right angle to the slow axis direction in the plane, and $n_z$ is a refractive index in a thickness direction, or satisfies a relation of $0.92 \leq R_{40}/Re \leq 1.08$, in which Re is a retardation value at an incident angle of 0 degrees, and $R_{40}$ is the retardation value at an incident angle of 40 degrees, can be highly accurate and easily manufactured by (a) uniaxially stretching an original film for producing retardation film in a direction at either a temperature T1 or T2, and then, (b) uniaxially stretching the film stretched in the step (a) in a direction perpendicular to the direction of the stretching in the step (a) at a different temperature T2 or T1 from the temperature in the step (a), in which the original film for producing retardation film has a characteristic that a phase of linearly polarized light entering vertically into a film plane and having an oscillating surface of an electric vector in an X-Z plane against that of linearly polarized light entering vertically into the film plane and having an oscillating surface of an electric vector in a Y-Z plane lags by uniaxially stretching in a direction of the X axis at a temperature T1, and leads by uniaxially stretching in a direction of the X axis at a temperature T2 different from the above-mentioned temperature T1, in which the X axis is an uniaxially stretching direction, the Y axis is a direction perpendicular to the uniaxially stretching direction in the film plane, and the Z axis is a direction of a thickness of the film.

The present invention has been completed based on these findings and further studies.

That is, the present invention includes the following modes.

(1) A method for producing a retardation film which satisfies a relation of $n_x>n_z>n_y$, in which $n_x$ is a refractive index in a slow axis direction in a plane of the film, $n_y$ is a refractive index in a direction perpendicular to the slow axis direction in the plane, and $n_z$ is a refractive index in a thickness direction, comprising steps of: (a) uniaxially stretching an original film for producing retardation film in one direction at either a temperature T1 or T2; and then (b) uniaxially stretching the film stretched in the step (a) in a direction perpendicular to the above-mentioned direction of stretching in the step (a) at a temperature T2 or T1 different from the above-mentioned temperature in the step (a), in which the original film for producing retardation film has a characteristic that a phase of linearly polarized light entering vertically into the film plane and having an oscillating surface of an electric vector in an X-Z plane against that of linearly polarized light entering vertically into the film plane and having an oscillating surface of an electric vector in a Y-Z plane lags by uniaxially stretching in a direction of the X axis at a temperature T1, and leads by uniaxially stretching in a direction of the X axis at a temperature T2 different from the above-mentioned temperature T1, in which the X axis is an uniaxially stretching direction, the Y axis is a direction perpendicular to the uniaxially stretching direction in the film plane, and the Z axis is a direction of a thickness of the film.

(2) A method for producing a retardation film which satisfies a relation of $0.92 \leq R_{40}/Re \leq 1.08$, in which Re is a retardation value at an incident angle of 0 degrees, and $R_{40}$ is a retardation value at an incident angle of 40 degrees, comprising steps of: (a) uniaxially stretching an original film for producing retardation film in one direction at either a temperature T1 or T2; and then (b) uniaxially stretching the film stretched in the step (a) in a direction perpendicular to the above-mentioned direction of stretching in the step (a) at a temperature T2 or T1 different from the above-mentioned temperature in the step (a), in which the original film for producing retardation film has a characteristic that a phase of linearly polarized light entering vertically into the film plane and having an oscillating surface of an electric vector in an X-Z plane against that of linearly polarized light entering vertically into the film plane and having an oscillating surface of an electric vector in a Y-Z plane lags by uniaxially stretching in a direction of the X axis at a temperature T1, and leads by uniaxially stretching in a direction of the X axis at a temperature T2 different from the above-mentioned temperature T1, in which the X axis is a uniaxially stretching direction, the Y axis is a direction perpendicular to the uniaxially stretching direction in the film plane, and the Z axis is a direction of a thickness of the film.

(3) An original film for producing retardation film having a characteristic that a phase of linearly polarized light entering vertically into the film plane and having an oscillating surface of an electric vector in an X-Z plane against that of linearly polarized light entering vertically into the film plane and having an oscillating surface of an electric vector in a Y-Z plane lags by uniaxially stretching in a direction of X axis at a temperature T1, and leads by uniaxially stretching in a direction of X axis at a temperature T2 different from the above-mentioned temperature T1, in which X axis is an uniaxially stretching direction, Y axis is a direction perpendicular to the uniaxially stretching direction in the film plane, and Z axis is a direction of a thickness of the film.

(4) The original film for producing retardation film according to the above (3), in which the original film is a laminate of a layer composed of a thermoplastic resin A having a positive intrinsic birefringence and a layer composed of a thermoplastic resin B having a negative intrinsic birefringence.

(5) The original film for producing retardation film according to the above (3) or (4), in which an absolute value of difference between a deflection temperature under load $Ts_A$ of the thermoplastic resin A and a deflection temperature under load $Ts_B$ of the thermoplastic resin B is 5° C. or more.

(6) The original film for producing retardation film according to any one of the above (3) to (5), in which a rupture elongation of the thermoplastic resin A at the temperature $Ts_B$ and a rupture elongation of the thermoplastic resin B at the temperature $Ts_A$ are both 50% or more.

(7) The original film for producing retardation film according to any one of the above (3) to (6), in which the thermoplastic resin A is a polycarbonate resins and the thermoplastic resin B is a polystyrene resins.

(8) The original film for producing retardation film according to any one of the above (3) to (7), in which a ratio of sum total thickness of layers composed of the thermoplastic resin A and sum total thickness of layers composed of the thermoplastic resin B is 1:5 to 1:10.

Advantages of the Invention

In a method for producing a retardation film according to the present invention, a retardation film with a large area which satisfies a relation of $n_x>n_z>n_y$, or a relation of $0.92 \leq R_{40}/Re \leq 1.08$ can be accurately and easily manufactured.

BRIEF DESCRIPTION OF THE DRAWINGS

FIG. 1 shows a temperature dependence of retardations of layer A, layer B, and a laminate of layer A and layer B.

BEST MODE FOR CARRYING OUT THE INVENTION

In the present invention, the method for producing a retardation film which satisfies a relation of $n_x>n_z>n_y$, in which $n_x$ is a refractive index in a slow axis direction in a plane, $n_y$ is a refractive index in a direction perpendicular to the slow axis direction in the plane, and $n_z$ is a refractive index in a thickness direction of the film and/or satisfies a relation of $0.92 \leq R_{40}/Re \leq 1.08$, in which Re is a retardation value at an incident angle of 0 degrees, and $R_{40}$ is a retardation value at an incident angle of 40 degrees comprises the steps of: (a) uniaxially stretching an original film for producing retardation film described later in a direction at either a temperature T1 or T2; and then (b) uniaxially stretching the film stretched in the step (a) in a direction perpendicular to the above-mentioned direction of stretching in the step (a) at a temperature T2 or T1 different from the above-mentioned temperature in the step (a).

(An Original Film for Producing Retardation Film)

An original film for producing retardation film in the present invention has a characteristic that a phase of linearly polarized light entering vertically into the film plane and having an oscillating surface of an electric vector in an X-Z plane against that of linearly polarized light entering vertically into the film plane and having an oscillating surface of an electric vector in a Y-Z plane lags by uniaxially stretching in a direction of X axis at a temperature T1, and leads by uniaxially stretching in a direction of X axis at a temperature T2 different from the above-mentioned temperature T1, in which X axis is an uniaxially stretching direction, Y axis is a direction perpendicular to the uniaxially stretching direction in the film plane, and Z axis is a direction of a thickness of the film.

In a film that a slow axis appears in the X axis by the uniaxial stretching, a phase of linearly polarized light having an oscillating surface of an electric vector in an X-Z plane lags against that of linearly polarized light having an oscillating surface of an electric vector in a Y-Z plane. Oppositely, in a film that a fast axis appears in the X axis by the uniaxial stretching, a phase of linearly polarized light having an oscillating surface of an electric vector in an X-Z plane leads against that of linearly polarized light having an oscillating surface of an electric vector in a Y-Z plane.

The original film for producing the retardation film in the present invention is a film which has a dependence of appearance of the slow axis or the fast axis on a stretching temperature.

Such a film having the temperature dependence of the phase difference appearance can be obtained by laminating a layer composed of a thermoplastic resin A that has a positive intrinsic birefringence and a layer composed of a thermoplastic resin B that has a negative intrinsic birefringence while adjusting a relationship of a photoelastic coefficient of the thermoplastic resins and a ratio of thicknesses of the each resin layer, and the like.

In this specification, a positive intrinsic birefringence means that a refractive index in a stretching direction is larger than a refractive index in a direction perpendicular to the stretching direction, and a negative intrinsic birefringence means that a refractive index in a stretching direction is smaller than a refractive index in a direction perpendicular to the stretching direction. The intrinsic birefringence may be calculated from the permittivity distribution.

A thermoplastic resin A having a positive intrinsic birefringence includes: olefin resins such as polyethylene, polypropylene and the like; polyester resins such as polyethylene terephthalate, polybutylene terephthalate and the like; polyarylene sulfide resins such as polyphenylene sulfide and the like; polyvinyl alcohol resins, polycarbonate resins, polyarylate resins, cellulose ester resins, polyether sulfone resins, polysulfone resins, polyallyl sulfone resins, polyvinyl chloride resins, norbornene resins, rod-like liquid crystalline polymers, and the like. The resin may be used as single or in combination of two or more. In the present invention, among these, polycarbonate resin is preferable according to the viewpoint of an appearance of a phase difference, a stretching property at a low temperature, and an adhesive quality with another layer.

A deflection temperature under load $Ts_A$ of the above-mentioned thermoplastic resin A is preferably 80° C. or more, more preferably 110° C. or more, and particularly preferably 120° C. or more. When the deflection temperature under load is lower than the above-mentioned lower limit value, the orientation easily relaxes.

A thermoplastic resin B having a negative intrinsic birefringence includes polystyrene resins such as homopolymer of styrene or styrene derivative, or copolymers thereof with other monomer; polyacrylonitrile resins, polymethyl methacrylate resins, or multicomponent copolymers thereof and the like. The resin may be used as single or in combination of two or more. As the other monomers which is contained in the polystyrene resins, acrylonitrile, maleic anhydride, methyl methacrylate, and butadiene are preferably mentioned. In the present invention, among these, polystyrene resins is preferable in the viewpoint of an excellent appearance of a phase difference, and moreover the copolymer of styrene or styrene derivative and maleic anhydride is especially preferable in the point of excellent thermal resistance.

A deflection temperature under load $Ts_B$ of the above-mentioned thermoplastic resin B is preferably 80° C. or more, more preferably 110° C. or more, and particularly preferably 120° C. or more. When the deflection temperature under load is lower than the above-mentioned lower limit value, an orientation easily relaxes.

An absolute value of a difference between the deflection temperature under load $Ts_A$ of a thermoplastic resin A and the deflection temperature under load $Ts_B$ of a thermoplastic resin B is preferably 5° C. or more, more preferably 5 to 40° C., and especially preferably 8 to 20° C. When the difference between the deflection temperatures under load is too small, a temperature dependence of an appearance of a phase difference decreases. When the difference between the deflection temperatures under load is too large, it becomes difficult to stretch a thermoplastic resin having a high deflection temperature under load, and the planarity of a retardation film is easy to decrease. The above-mentioned deflection temperature under load $Ts_A$ of a thermoplastic resin A is preferably higher than the deflection temperature under load $Ts_B$ of a thermoplastic resin B.

Each of a rupture elongation of a thermoplastic resin A at a temperature of $Ts_B$ and a rupture elongation of a thermoplastic resin B at a temperature of $Ts_A$ is preferably 50% or more, and more preferably 80% or more. A thermoplastic resin having the rupture elongation in this range can stably provide the retardation film by stretching. The rupture elongation is measured using a test piece of type 1B described in JIS (Japanese Industrial Standard) K 7127 at the drawing speed of 100 mm/minute.

Compounding agents may be added to thermoplastic resin A and/or thermoplastic resin B, if a total light transmittance in 1 mm thickness may be maintained to 80% or more. The added compounding agent is not especially limited. Examples of the compounding agent include lubricants; lamellar crystal compounds; inorganic particulates; stabilizers such as antioxidant, thermal stabilizers, optical stabilizers, weathering stabilizers, ultraviolet absorbers, and near-infrared radiation absorbents; plasticizer; colorant such as dyes and pigments; antistatic agent; and the like. The amount of the compounding agent may be accordingly decided within a range where the object of the present invention is not ruined. In particular, lubricant or ultraviolet absorber may be preferably added to improve a flexibility and a weather resistance.

The lubricant includes inorganic particles such as silica dioxide, titanium dioxide, magnesium oxide, calcium carbonate, magnesium carbonate, barium sulphate, and strontium sulphate; organic particles such as polymethyl acrylate, polymethyl methacrylate, polyacrylonitrile, polystyrene, cellulose acetates, and cellulose acetate propionates. In the present invention, the organic particle is preferable as the lubricant.

The ultraviolet absorber includes oxybenzophenone compounds, benzotriazol compounds, salicylate ester compounds, benzophenone ultraviolet absorbers, benzotriazol ultraviolet absorbers, acrylonitrile ultraviolet absorbers, triazine compounds, nickel complex salt compounds, and inorganic fine particles. The preferred ultraviolet absorber includes 2,2'-methylene-bis(4-(1,1,3,3-tetramethylbutyl)-6-

(2H-benzotriazol-2-yl)phenol), 2-(2'-hydroxy-3'-tert-butyl-5'-methylphenyl)-5-chlorobenzotriazol, 2,4-di-tert-butyl-6-(5-chlorobenzotriazol-2-yl)phenol, 2,2'-dihydroxy-4,4'-dimethoxybenzophenone, and 2,2',4,4'-tetrahydroxybenzophenone. The especially preferred ultraviolet absorber includes 2,2'-methylene-bis(4-(1,1,3,3-tetramethylbutyl)-6-(2H-benzotriazol-2-yl)phenol).

Each of a layer composed of a thermoplastic resin A and a layer composed of a thermoplastic resin B may have one layer or more than two layers. A phase difference is a value obtained by multiplying a thickness d by a difference ($=n_X-n_Y$) between a refractive index $n_X$ in a direction of an X axis that is a stretching direction and a refractive index $n_Y$ in a direction of a Y axis perpendicular to the stretching direction. A phase difference of a laminated body of a layer (layer A) composed of a thermoplastic resin A and a layer (layer B) composed of a thermoplastic resin B is a combine of a phase difference of the layer A and a phase difference of the layer B. In order that signs of a phase difference of the laminated body composed of the layer A and the layer B may invert by stretching at a high temperature $T_H$ and a low temperature $T_L$, it is preferable to adjust the thickness of the both resin layers so as to be an absolute value of a phase difference which appears in a resin having a high deflection temperature under load smaller than the absolute value of the phase difference which appears in a resin having a low deflection temperature under load by stretching at low temperature $T_L$, and so as to be an absolute value of the phase difference which appears in the resin having the low deflection temperature under load smaller than an absolute value of the phase difference which appears in the resin having the high deflection temperature under load by stretching at high temperature $T_H$. In this way, adjustments of a difference between refractive index $n_X$ in a direction of X axis and refractive index $n_Y$ in a direction of Y axis which appears in each of layer A and layer B by uniaxial stretching; the total thickness of layer(s) A; and the total thickness of layer(s) B can give a film having a characteristic that a phase of linearly polarized light entering vertically into a film plane and having an oscillating surface of an electric vector in an X-Z plane against a phase of linearly polarized light entering vertically into the film plane and having an oscillating surface of an electric vector in a Y-Z plane lags by uniaxially stretching in a direction of the X axis at a temperature T1, and leads by uniaxially stretching in the direction of the X axis at a temperature T2 different from the above-mentioned temperature T1. Here, the temperature T1 is a temperature either $T_H$ or $T_L$, and the temperature T2 is a temperature either $T_H$ or $T_L$ different from T1.

FIG. 1 shows a temperature dependence of phase difference of layer A which is a layer composed of a thermoplastic resin A having a high deflection temperature under load or layer B which is a layer of a thermoplastic resin B with a low deflection temperature under load in an original film for producing retardation film in the present invention when layer A or layer B is respectively stretched; and a temperature dependence of phase difference of the original film for producing retardation film in the present invention when the original film (layer A+layer B) is stretched. By stretching at the temperature Tb, since a phase difference of a minus that appears by layer B is bigger than a phase difference of a plus that appears by layer A, a phase difference of a minus A appears by (layer A+layer B). On the other hand, by stretching at the temperature Ta, since a phase difference of a minus that appears by layer B is smaller than a phase difference of a plus that appears by layer A, a phase difference of a plus A appears by (layer A+layer B).

For example, when layer A is a polycarbonate resin, and layer B is a copolymer of styrene and maleic anhydride, a ratio of a sum total thickness of layer(s) A and a sum total thickness of layer(s) B is preferably 1:5 to 1:15, and more preferably 1:5 to 1:10. If layer A becomes thick too much or layer B becomes thick too much, a temperature dependence of a appearance of a phase difference decreases.

A total thickness of an original film for producing retardation film in the present invention is preferably 10 to 500 µm, more preferably 20 to 200 µm, and especially preferably 30 to 150 µm. When the above-mentioned total thickness is thinner than 10 µm, it is difficult to obtain an enough phase difference and mechanical strength of the film weakens. When the above-mentioned total thickness is thicker than 500 µm, flexibility deteriorates and it might interfere with handling.

The thickness of layer A and layer B is decided by measuring a total thickness of the film using a contact thickness gauge in the marketplace; cutting a portion where the thickness is measured; observing the cutting surface with a photon microscope to measure a ratio of a thickness of an each layers; and calculating the thickness of layer A and layer B from the ratio. The above-mentioned operations were done in a direction of MD and a direction of TD of the film at constant intervals, and a mean value of the thickness and the data spread of the thickness were decided.

Here, the data spread of thickness is calculated by the following expressions:

A data spread of a thickness (µm)=Large one of $T_{ave}-T_{min}$ or $T_{max}-T_{ave}$ in which $T_{max}$ represents the maximum value in the measured thickness T, $T_{min}$ represents the minimum value in the measured thickness T, and $T_{ave}$ represents an arithmetic mean value of thickness T measured by the above-mentioned measurements.

When the data spread of the thickness of layer A and layer B is 1 µm or less in the entire plane, the variability of a color tone becomes small and a change of a color tone after long-term using becomes uniform.

The following steps are performed to adjust the data spread of the thickness of layer A and layer B to 1 µm or less in the entire plane: (1) a polymer filter having a mesh spacing of 20 µm or less is attached in an extruding machine; (2) a gear pump is rotated by 5 rpm or more; (3) an enclosure means is attached to surroundings of a die; (4) an air gap is set to 200 mm or less; (5) an edge pinning is performed when a film is casted to a cooling roll; and (6) a two axis extruding machine or a single axis extruding machine which has a double flight type screw is used as the extruding machine.

An original film for producing retardation film in the present invention may have a layer other than layer A and layer B. Examples of the other layer include a bonding layer to bond layer A and layer B, a mat layer to improve slipperiness of the film, a hard coat layer such as an impact-resistant polymethacrylate resin layer, and the like, an antireflection layer, and an antifouling layer, and the like.

The original film for producing the retardation film in the present invention is preferably 85% or more in a total light transmittance. When the total light transmittance is less than 85%, the film tends to be unsuitable to an optical material. The above-mentioned light transmittance is measured by using the spectrophotometer (manufactured by JASCO Corporation; Ultraviolet Visible Near-infrared Spectrophotometer "V-570") in accordance with JIS K 0115.

A haze of the original film for producing the retardation film in the present invention is preferably 5% or less, more preferably 3% or less, and especially preferably 1% or less. When the haze is high, a sharpness of a display image tends to decrease. Here, the haze is a mean value of turbidities measured at five places by using "Turbidimeter NDH-300A" manufactured by Nippon Denshoku Industries Co., Ltd. in accordance with JIS K 7361-1997.

The original film for producing the retardation film in the present invention is preferably 5 or less, and more preferably 3 or less in ΔYI. When the ΔYI is within the above-mentioned range, a visibility improves since there is not coloring. ΔYI is measured by using Spectro color difference meter "SE2000" manufactured by the Nippon Denshoku Industries Co., Ltd. in accordance with ASTME313. The Similar measurement is carried out five times, and the ΔYI is obtained as an arithmetic mean value of the measurements.

The original film for producing the retardation film in the present invention is preferably H or harder in the JIS pencil hardness. This JIS pencil hardness may be adjusted by changing a kind of a resin and changing the thickness of the resin layer, and the like. A surface of a film is scratched with a pencil having various hardness inclined to 45 degrees and pushed on by a load weight of 500 gram-weight, in accordance with JIS K 5600-5-4, sequentially from the pencil having low hardness, and the JIS pencil hardness means a hardness of the first pencil by which the scar is applied to the film.

A surface of the outside of the original film for producing the retardation film in the present invention is preferably smooth and has preferably substantially neither a linear concave portion nor a linear convex portion (so-called die line) that is parallel in the direction of MD and is irregularly formed. Here, "be smooth and have substantially neither a linear concave portion nor a linear convex portion that is irregularly formed" means that a depth of the linear concave portion is less than 50 nm or a width of the linear concave portion is bigger than 500 nm and a height of the linear convex portion is less than 50 nm or a width of the linear convex portion is bigger than 500 nm, even if the linear concave portion or the linear convex portion is formed. Preferably, the depth of the linear concave portion is less than 30 nm or the width of the linear concave portion is bigger than 700 nm and the height of the linear convex portion is less than 30 nm or the width of the linear convex portion is bigger than 700 nm. This formation may prevent a light interference, an optical leakage and the like caused by the refraction of light at the linear concave portion or the linear convex portion, which may result in improving an optical performance. "be irregularly formed" means that the linear concave portion and the linear convex portion are formed at the unintended position, with the unintended size, the unintended shape and the like.

The above-mentioned depth of the linear concave portion, the height of the linear convex portion, and the width of those may be measured by the method of the description as follows. Light is irradiated to the original film for producing the retardation film, transmitted light is projected onto a screen, then a part where stripes of light and shade exist that appears on the screen (in this part, the depth of a linear concave portion and the height of a linear convex portion are big) is cut out in square of 30 mm×30 mm. The surface of the film section cut out is observed by using a three-dimensional surface structure analyzing microscope (view area of 5 mm×7 mm), this observation result is converted into a three dimension image, and a cross-section profile is obtained from the three dimensional image. Here, the cross-section profile is obtained at intervals of 1 mm in a view area.

An average line is drawn at this cross-section profile, then length from this average line to the bottom of a linear concave portion is taken as a depth of linear concave portion, moreover length from this average line to a top of the linear convex portion is taken as a height of a linear convex portion. The distance between intersections of the average line and the profile line is taken as width. Each of the maximum value is obtained from the measured depth of the linear concave portion and the measured height of the linear convex portion. And each of the width of the linear concave portion or the linear convex portion that indicates the maximum value is obtained. The maximum value of the depth of the above-mentioned linear concave portion is taken as a depth of the linear concave portion of the film, and the maximum value of the height of the above-mentioned linear convex portion is taken as a height of the linear convex portion of the film, and the width of a linear concave portion that indicates the maximum depth value is taken as the width of a linear concave portion of the film, and the width of a linear convex portion that indicates the maximum height value is taken as the width of a linear convex portion of the film.

The original film for producing the retardation film in the present invention is not especially limited by the producing method thereof. Mentioned as the producing method is a well-known method including a coextrusion molding method such as a coextrusion T-die method, a coextrusion inflation method, and a coextrusion lamination method and the like; a film lamination molding method such as a dry lamination and the like; and a coating molding method such as an application of a resin solution on a resin film; and the like. In particular, the coextrusion molding method is preferable from the viewpoint of producing efficiency and preventing volatile contents such as solvents from remaining in the film. The coextrusion T-die method is preferable in the coextrusion molding method. There are a feed block method and a multi manifold method as the coextrusion T-die method. The multi manifold method is especially preferable from the viewpoint of decreasing the variability of the thickness of layer A.

When the coextrusion T-die method is adopted as a method of obtaining the multilayer film, a temperature of melted resin material in extruding machine equipped with T-die is preferably a temperature that is higher than a glass transition temperature (Tg) of the thermoplastic resin used as each resin material by 80 to 180° C., and more preferably a temperature that is higher than the glass transition temperature by 100 to 150° C. When the temperature of melted resin material in the extruding machine is excessive low, a flowability of the resin material might be insufficient, oppositely when the temperature of melted resin material is excessive high, the resin might be deteriorated.

The temperature of extrusion may be properly selected according to the thermoplastic resin used. A temperature of a resin slot is preferably Tg to (Tg+100)° C., a temperature of an exit of the extruding machine is preferably (Tg+50)° C. to (Tg+170)° C., and a temperature of a die is preferably (Tg+50)° C. to (Tg+170)° C., in which these temperatures are measured in the extruding machine. Here, Tg means a glass transition temperature of a thermoplastic resin A used as a resin material.

In the extrusion molding method, a sheeted melted resin material extruded from a opening of the die is pinned on a cooling drum. A method of pinning a melted resin material on a cooling drum is not especially limited, and examples of the method include an air knife method, a vacuum box method, and a electrostatic pinning method, and the like.

The number of cooling drums is usually two or more, though the number is not particularly limited. Moreover, examples of a method of arranging the cooling drums include a straight line type, a Z type, and a L type, though the method is not particularly limited. Moreover, the method of passing the melted resin extruded from the opening of the die between the cooling drums is not particularly limited.

In the present invention, the adhesion to the cooling drum of the extruded sheeted resin material changes depending on the temperature of the cooling drum. The adhesion improves when a temperature of the cooling drum is raised. However, trouble that the sheeted resin material coils around the drum without peeling off from the cooling drum might occur when the temperature of the cooling drum is raised too much. Therefore, a temperature of the cooling drum is preferably no more than (Tg+30)° C., and more preferably (Tg−5)° C. to (Tg−45)° C., in which Tg is a glass transition temperature of a thermoplastic resin A extruded from the die. The trouble such as slipping and wounds may be prevented by doing so.

Moreover, it is preferable to reduce a content of a residual solvent in the film. Examples of the method for reducing the content include (1) a method of reducing residual solvent in thermoplastic resin as raw material; (2) a method of preliminary drying resin material before film is molded; and the like. The preliminary drying is done by using the hot air dryer and the like for example after the resin material is molded into the form such as pellets and the like. The drying temperature is preferable 100° C. or more, and the drying time is preferable 2 hours or more. By doing the preliminary drying, the residual solvent in the film may be decreased, and the extruded sheeted resin material may be prevented from foaming.

The step of preheating the original film for producing the retardation film (preheating process) may be performed before the original film for producing the retardation film is stretched. As a means to heat the original film for producing the retardation film, a oven type heating device, a radiation heating device, soaking the film in the liquid, and the like are mentioned. In these, the oven type heating device is especially preferable. A heating temperature in the preheating process is usually (the stretching temperature−40)° C. to (the stretching temperature+20)° C., and preferably (the stretching temperature−30)° C. to (the stretching temperature+15)° C. The stretching temperature means the preset temperature of the heating unit.

(First Stretching Process)

In the present invention, the above-mentioned original film for producing retardation film is uniaxially stretched at either a temperature T1 or T2, first. When stretching at temperature T1, a phase of linearly polarized light entering vertically into the film plane and having an oscillating surface of an electric vector in an X-Z plane lags against a phase of linearly polarized light entering vertically into the film plane and having an oscillating surface of an electric vector in a Y-Z plane. On the other hand, when uniaxially stretching at a temperature T2, a phase of linearly polarized light entering vertically into the film plane and having an oscillating surface of an electric vector in an X-Z plane leads against a phase of linearly polarized light entering vertically into the film plane and having an oscillating surface of an electric vector in a Y-Z plane.

When a relation of $Ts_A > Ts_B$ is satisfied, the temperature T1 is preferably $(Ts_B+3)$° C. or more and $(Ts_A+5)$° C. or less, and more preferably $(Ts_B+5)$° C. or more and $(Ts_A+3)$° C. or less. Moreover, the temperature T2 is preferably $(Ts_B+3)$° C. or less, and more preferably $Ts_B$ or less. The first stretching process is preferably performed at the temperature T1.

When a relation of $Ts_B > Ts_A$ is satisfied, the temperature T2 is preferably $(Ts_A+3)$° C. or more and $(Ts_B+5)$° C. or less, and more preferably $(Ts_A+5)$° C. or more and $(Ts_B+3)$° C. or less. Moreover, the temperature T1 is preferably $(Ts_A+3)$° C. or less, and more preferably $Ts_A$ or less. The first stretching process is preferably performed at the temperature T2.

The first stretching process may be performed by a conventionally well-known method, for example, which includes a method of uniaxially stretching in the longitudinal direction by using the difference of the rim speed between rolls, a method of uniaxially stretching in the transverse direction by using the tenter, and the like. The method of uniaxially stretching in the longitudinal direction includes an IR heating method between rolls, a floating method, and the like. The floating method is suitable from the viewpoint of obtaining a retardation film with high optical uniformity. The method of uniaxially stretching in the transverse direction includes a tenter method.

To reduce an irregular stretching and irregular thickness, it is allowable to make a difference of a temperature in a direction of a width of the film at a stretching zone. To make the difference of the temperature in a direction of the width of the film at the stretching zone, well-known methods such as a method of adjusting a gate opening of hot air nozzle in a direction of width, a method of setting IR heaters in a direction of width and controlling heating, and the like may be used.

(Second Stretching Process)

Then, the film is uniaxially stretched in a direction perpendicular to the direction of the first uniaxial extension at a different temperature T2 or T1 from the temperature in the above-mentioned first stretching process. The second stretching process is preferably performed at a temperature T2 when a relation of $Ts_A > Ts_B$ is satisfied, and is preferably performed at temperature T1 when the relation of $Ts_B > Ts_A$ is satisfied. In the second stretching process, a method that may be employed by the first stretching process may be employed as it is. A stretching ratio in the second stretching process is preferably smaller than the stretching ratio in the first stretching process.

After the first stretching process and/or the second stretching process, a fixation process may be applied to the stretching film. A temperature in the fixation process is usually (room temperature) to (the stretching temperature+30)° C., and preferably (the stretching temperature−40)° C. to (the stretching temperature+20)° C.

A method for producing a retardation film in the present invention can easily give a retardation film having large area which satisfies a relation of $0.92 \le R_{40}/Re \le 1.08$, in which Re is a retardation value at an incident angle of 0 degrees, and $R_{40}$ is a retardation value at an incident angle of 40 degrees; and/or a retardation film having large area which satisfies a relation of $n_x > n_z > n_y$, in which $n_x$ is a refractive index in a slow axis direction in the plane, $n_y$ is a refractive index in a direction perpendicular to the slow axis direction in the plane, and $n_z$ is a refractive index in a thickness direction of the film.

The retardation film obtained by the producing method in the present invention is preferably 50 to 400 nm, and more preferably 100 to 350 nm in a retardation Re at an incident angle of 0 degrees in a wavelength of 550 nm. Here, Re and $R_{40}$ are the values measured by using the parallel Nicols rotation method (manufactured by Oji Scientific Instruments Co., Ltd.; KOBRA-WR) in a wavelength of 550 nm. The refractive index $n_x$, $n_z$, and $n_y$ are calculated by Re, $R_{40}$, film thickness, and average refractive index $n_{ave}$ of the retardation film. The $n_{ave}$ is determined according to the following expression:

$$n_{ave}=\Sigma(n_i \times L_i)/\Sigma L_i$$

$n_i$: refractive index of an i-th layer resin
$L_i$: film thickness of an i-th layer The retardation film obtained by the producing method in the present invention may be preferably 0.5% or less, more preferably 0.3% or less in a shrinkage percentage in a longitudinal and transverse direction after heat-treating for 100 hours at 60° C. and 90% RH. When the shrinkage percentage exceeds this range, a transformation of the retardation film and flaking off from the display device are caused by the shrinkage stress by using under the environment of the high temperature and high humidity.

The retardation film obtained by the producing method in the present invention may be employed as single or in combination with other materials in a liquid crystal display device, an organic EL display device, a plasma display device, a FED (field emission) display device, and a SED (surface electric field) display device, or the like, since the retardation film can give advanced birefringence compensations.

The liquid crystal display device comprises the liquid crystal panel that a polarizing plate on an incident side of light, a liquid crystal cell, and a polarizing plate on an output side of light are arranged in this order. A visibility of the liquid crystal display device may be improved greatly by arranging the retardation film obtained by the producing method in the present invention between the liquid crystal cell and the polarizing plate on the light incident side and/or between the liquid crystal cell and the polarizing plate on the light output side. A drive mode for the liquid crystal cell includes In Plane Switching (IPS) mode, Vertical Alignment (VA) mode, Multi domain Vertical Alignment (MVA) mode, Continuous Pinwheel Alignment (CPA) mode, Hybrid Alignment Nematic (HAN) mode, Twisted Nematic (TN) mode, Super Twisted Nematic (STN) mode, Optical Compensated Bend (OCB) mode and the like.

The retardation film obtained by the producing method in the present invention may be stuck to the liquid crystal cell or the polarizing plate. The retardation film may be stuck to both sides of the polarizing plate or to one side of the polarizing plate. Also, two or more sheets of the retardation films may be used. A well-known adhesive agent may be used for sticking.

The polarizing plate is composed of a polarizer and protective films stuck to the both sides of the polarizer. The retardation film may be used as a protective film by sticking the retardation film obtained by the producing method in the present invention directly to the polarizer in place of the protective film. Since the protective film is omitted, the liquid crystal display device can be thinned.

EXAMPLES

The present invention will be explained more specifically with reference to EXAMPLES in the following. However, the present invention is not limited to the examples. In the following EXAMPLES, "parts" or "%" is by weight unless otherwise specified.
(Thickness of Transparent Film)
A thickness of a film was measured by a contact thickness gauge.

A film was embedded into an epoxy resin, the film was sliced into pieces using a microtome (manufactured by YAMATO KOHKI INDUSTRIAL Co., Ltd.; "RUB-2100"), and then the cross-section of the piece was observed using a scanning electron microscope to determine a thickness of the each layer composing the film.
(Light Transmittance)
A light transmittance of a film was measured by using a spectrophotometer (manufactured by JASCO Corporation; Ultraviolet Visible Near-infrared Spectrophotometer "V-570") in accordance with JIS K 0115.
(Deflection Temperature Under Load)
A deflection temperature under load of the resin was measured by using a test piece made in accordance with JIS K 7191.
(Re, $R_{40}$, Angle of Slow Axis)
Re, $R_{40}$, an angle of the slow axis to a longitudinal direction and of the film in a wavelength of 590 nm were measured by using the parallel Nicols rotation method (manufactured by Oji Scientific Instruments Co., Ltd.; KOBRA-WR).

The similar measurement was performed in a direction of width of the phase difference film at equal intervals by ten points, and the mean value was calculated.

Moreover, average refractive index $n_{ave}$ of the laminated film was determined according to the following expression.

$$n_{ave}=\Sigma(n_i \times L_i)/\Sigma L_i$$

$n_i$: refractive index of i-th layer resin
$L_i$: film thickness of i-th layer

In addition, $n_x$, $n_y$, and $n_z$ of the laminated film were calculated from the above-mentioned Re, $R_{40}$, $n_{ave}$, thickness and of the film.

Producing Example 1

A film molding device for coextrusion molding of two kinds and two layers was prepared. Then, pellets of polycarbonate resin (Made by Asahi Chemical Industrial Co., Ltd., WONDER LIGHT PC-110, a deflection temperature under load is 145° C.) were put in one uniaxially extruding machine which was equipped with a screw of the double flight type, and were melted.

Pellets of the styrene-maleic anhydride copolymer resin (made by NOVA Chemicals Ltd., Dylark D332, a deflection temperature under load is 135° C.) were put in the other uniaxially extruding machine which was equipped with a screw of the double flight type, and were melted.

The melted polycarbonate resin at a temperature of 260° C. was supplied to one manifold in a multi manifold die (surface-roughness of the die lip Ra is 0.1 µm) through a polymer filter having a leaf disk shape and a mesh spacing of 10 µm, and the melted styrene-maleic anhydride copolymer resin at a temperature of 260° C. was supplied to the other manifold in the multi manifold die through a polymer filter having a leaf disk shape and a mesh spacing of 10 µm.

The polycarbonate resin and the styrene-maleic anhydride copolymer resin were extruded from the multi manifold die at the same time at 260° C. and were made into a melted resin film.

The melted resin film was casted on a cooling roll modulated at 130° C. in the surface temperature, and then was passed between two cooling rolls that was modulated at 50° C. in the surface temperature to obtain a laminated film 1 being 1350 mm in width and 180 µm in thickness composed of the polycarbonate resin layer (layer A: 20 μm) and the styrene-maleic anhydride copolymer resin layer (layer B: 160 μm).

Producing Example 2

A laminated film 2 being 1350 mm in width and 180 μm in thickness composed of the polycarbonate resin layer (layer A: 36 μm) and the styrene-maleic anhydride copolymer resin layer (layer B: 144 μm) was obtained in the same manner as in PRODUCING EXAMPLE 1, except that the thickness of layer A was adjusted to 36 μm and the thickness of layer B was adjusted to 144 μm.

Producing Example 3

A laminated film 3 being 1350 mm in width and 180 μm in thickness composed of the polycarbonate resin layer (layer A: 10 μm) and the styrene-maleic anhydride copolymer resin layer (layer B: 170 μm) was obtained in the same manner as in PRODUCING EXAMPLE 1, except that the thickness of layer A was adjusted to 10 μm and the thickness of layer B was adjusted to 170 μm.

Producing Example 4

A laminated film 4 being 1350 mm in width and 180 μm in thickness composed of the polycarbonate resin layer (layer A: 80 μm) and a polystyrene resin layer (layer B: 90 μm) was obtained in the same manner as in PRODUCING EXAMPLE 1, except that the polystyrene resin (made by Japan Polystyrene Inc., HF44, a deflection temperature under load is 73° C.) was used in place of Dylark D332, the thickness of layer A was adjusted to 80 μm and the thickness of layer B was adjusted to 90 μm.

The laminated films 1 to 4 were uniaxially stretched by 1.25 times of stretching ratio in various temperatures in a longitudinal direction of the film. Table 1 shows the lag in a phase of which linearly polarized light entering vertically into the film plane and having an oscillating surface of an electric vector in an X-Z plane against linearly polarized light entering vertically into the film plane and having an oscillating surface of an electric vector in a Y-Z plane, in which an X axis is an uniaxially stretching direction, a Y axis is a direction perpendicular to the uniaxially stretching direction in the film plane, and a Z axis is a direction of a thickness of the film.

It is understood that the phase of linearly polarized light entering vertically into the film plane and having an oscillating surface of an electric vector in an X-Z plane against the phase of linearly polarized light entering vertically into the film plane and having an oscillating surface of an electric vector in a Y-Z plane in the laminated film 1, lags at 140° C. and 145° C. (a sign of retardation in phase is plus) and leads at 130° C. (a sign of retardation in phase is minus). It is understood that the phase of other laminated films didn't reverse between 120° C. to 145° C.

[Tab. 1]

TABLE 1

| | Retardation in phase at each stretching temperature (nm) | | | | | |
|---|---|---|---|---|---|---|
| | 120° C. | 130° C. | 135° C. | 140° C. | 145° C. | 150° C. |
| Laminated film 1 | Breaking | −205.1 | 10.9 | 97.9 | 88.6 | 42.9 |
| Laminated film 2 | Breaking | 16.6 | 228.3 | 279.0 | 233.8 | 137.2 |
| Laminated film 3 | Breaking | −343.7 | −125.0 | −15.4 | −2.2 | −16.1 |
| Laminated film 4 | 1913.5 | 1832.2 | 1734.6 | 1682.8 | 1359.4 | 867.9 |

Example 1

The laminated film 1 obtained in PRODUCING EXAMPLE 1 was supplied to a longitudinal uniaxially stretching machine, and the film was stretched in a longitudinal direction at a stretching temperature of 145° C. by a stretching magnification of 1.5 times.

Then, the stretched film was supplied to the tenter stretching machine, the film was stretched in a transverse direction at a stretching temperature of 130° C. by a stretching magnification of 1.25 times, and a retardation film 1 was obtained. The evaluation results are shown in Table 2.

Example 2

A retardation film 2 was obtained in the same manner as in EXAMPLE 1, except that the transversely stretching magnification was changed to 1.5 times. The evaluation results are shown in Table 2.

Comparative Example 1

A retardation film 3 was obtained in the same manner as in EXAMPLE 1, except that the transversely stretching temperature was changed to 145° C. The evaluation results are shown in Table 2.

Comparative Example 2

A retardation film 4 was obtained in the same manner as in EXAMPLE 1, except that the laminated film 1 was changed to the laminated film 2. The evaluation results are shown in Table 2.

Comparative Example 3

A retardation film 5 was obtained in the same manner as in EXAMPLE 1, except that the laminated film 1 was changed to the laminated film 3. The evaluation results are shown in Table 2.

Comparative Example 4

A retardation film 6 was obtained in the same manner as in EXAMPLE 1, except that the laminated film 1 was changed to the laminated film 4 and the transversely stretching temperature was changed to 70° C. The film after a transversely stretching whitened a little. The evaluation results are shown in Table 2.

[Tab. 2]

TABLE 2

|  | Example | | Comparative Example | | | |
| --- | --- | --- | --- | --- | --- | --- |
|  | 1 | 2 | 1 | 2 | 3 | 4 |
| Unstretched film | 1 | 1 | 1 | 2 | 3 | 4 |
| Longitudinal direction stretching temperature (° C.) | 145 | 145 | 145 | 145 | 145 | 145 |
| Longitudinal direction stretching magnification | 1.5 | 1.5 | 1.5 | 1.5 | 1.5 | 1.5 |
| Transverse direction stretching temperature (° C.) | 130 | 130 | 145 | 130 | 130 | 70 |
| Transverse direction stretching magnification | 1.25 | 1.5 | 1.25 | 1.25 | 1.25 | 1.25 |
| $n_x$ | 1.5379 | 1.5825 | 1.5817 | 1.5439 | 1.5814 | 1.5887 |
| $n_y$ | 1.5354 | 1.5795 | 1.5811 | 1.5411 | 1.5790 | 1.5864 |
| $n_z$ | 1.5367 | 1.5813 | 1.5805 | 1.5410 | 1.5814 | 1.5799 |
| Re | 247.8 | 238.5 | 59.8 | 270.2 | 233.7 | 224.0 |
| $R_{40}$ | 247.5 | 235.4 | 75.7 | 299.2 | 216.1 | 357.0 |
| $R_{40}$/Re | 1.00 | 0.99 | 1.27 | 1.11 | 0.93 | 1.59 |

As mentioned above, a retardation film having a large area which satisfies a relation of $n_x > n_z > n_y$, in which $n_x$ is a refractive index in a direction of a slow axis in a plane of the film, $n_y$ is a refractive index in a direction perpendicular to the direction of the slow axis in the plane, and $n_z$ is a refractive index in a thickness direction; or satisfies a relation of $0.92 \leq R_{40}/Re \leq 1.08$, in which Re is a retardation value at an incident angle of 0 degrees, and $R_{40}$ is a retardation value at an incident angle of 40 degrees, can be highly accurate and easily manufactured by uniaxially stretching an original film for producing retardation film in one direction at either a temperature T1 or T2, and then, uniaxially stretching in a direction perpendicular to the above-mentioned direction of stretching at a different temperature T2 or T1 from the above-mentioned temperature, in which the original film for producing the retardation film has a characteristic that a phase of linearly polarized light entering vertically into a film plane and having an oscillating surface of an electric vector in an X-Z plane against a phase of linearly polarized light entering vertically into the film plane and having an oscillating surface of an electric vector in a Y-Z plane lags by uniaxially stretching in a direction of X axis at a temperature T1, and leads by uniaxially stretching in a direction of X axis at a different temperature T2 from the above-mentioned temperature T1, in which X axis is the uniaxially stretching direction, Y axis is a direction perpendicular to the uniaxially stretching direction in the film plane, and Z axis is a direction of a thickness of the film.

What is claimed is:

1. A method for producing a retardation film which satisfies a relation of $0.92 \leq R_{40}/Re \leq 1.08$, in which Re is a retardation value at an incident angle of 0 degrees, and $R_{40}$ is a retardation value at an incident angle of 40 degrees, comprising the steps of:
   (a) uniaxially stretching an original film for producing retardation film in one direction at either a temperature T1 or T2; and then
   (b) uniaxially stretching the film stretched in the step (a) in a direction perpendicular to the above-mentioned direction of stretching in the step (a) at a temperature T2 or T1 different from the above-mentioned temperature in the step (a),
   in which the original film for producing the retardation film has a characteristic that a phase of linearly polarized light entering vertically into the film plane and having an oscillating surface of an electric vector in an X-Z plane against a phase of linearly polarized light entering vertically into the film plane and having an oscillating surface of an electric vector in a Y-Z plane lags by uniaxially stretching in the direction of the X axis at a temperature T1, and leads by uniaxially stretching in the direction of the X axis at a different temperature T2 from the above-mentioned temperature T1, in which the X axis is an uniaxially stretching direction, the Y axis is a direction perpendicular to the uniaxially stretching direction in the film plane, and the Z axis is a direction of a thickness of the film.

2. The method according to claim 1, in which the original film is a laminate of a layer composed of a thermoplastic resin A having a positive intrinsic birefringence and a layer composed of a thermoplastic resin B having a negative intrinsic birefringence.

3. The method according to claim 2, in which an absolute value of difference between a deflection temperature under load $Ts_A$ of the thermoplastic resin A and a deflection temperature under load $Ts_B$ of the thermoplastic resin B is 5° C. or more.

4. The method according to claim 2, in which a rupture elongation of the thermoplastic resin A at the temperature $Ts_B$ and a rupture elongation of the thermoplastic resin B at the temperature $Ts_A$ are both 50% or more.

5. The method according to claim 2, in which the thermoplastic resin A is a polycarbonate resin and the thermoplastic resin B is a polystyrene resin.

6. The method according to claim 2, in which a ratio of sum total thickness of layers composed of the thermoplastic resin A and sum total thickness of layers composed of the thermoplastic resin B is 1:5 to 1:10.

* * * * *